(12) United States Patent
Najafi et al.

(10) Patent No.: US 12,299,556 B2
(45) Date of Patent: May 13, 2025

(54) METHOD FOR PULSE-BASED CONVOLUTION FOR NEAR-SENSOR PROCESSING

(71) Applicant: University of Louisiana at Lafayette, Lafayette, LA (US)

(72) Inventors: Mohammad Hassan Najafi, Lafayette, LA (US); S. Rasoul Faraji, Minneapolis, MN (US); Kiarash Bazargan, Minneapolis, MN (US); David Lilja, Minneapolis, MN (US)

(73) Assignee: University of Louisiana at Lafayette, Lafayette, LA (US)

( * ) Notice: Subject to any disclaimer, the term of this patent is extended or adjusted under 35 U.S.C. 154(b) by 932 days.

(21) Appl. No.: 17/332,540

(22) Filed: May 27, 2021

(65) Prior Publication Data

US 2021/0374507 A1    Dec. 2, 2021

Related U.S. Application Data

(60) Provisional application No. 63/033,355, filed on Jun. 2, 2020.

(51) Int. Cl.
  *G06N 3/047* (2023.01)
  *G06F 7/544* (2006.01)
  *G06F 7/68* (2006.01)

(52) U.S. Cl.
  CPC ........... *G06N 3/047* (2023.01); *G06F 7/5443* (2013.01); *G06F 7/68* (2013.01); *G06F 2207/4818* (2013.01)

(58) Field of Classification Search
  CPC ....... G06N 3/047; G06F 7/5443; G06F 7/607; G06F 7/62; G06F 7/68; G06F 7/70; G06F 2207/4818; G06F 17/15–153; H03M 1/04; H03M 1/822; H03M 5/04; H03M 5/08; H03M 7/26; H03K 3/017
  See application file for complete search history.

(56) References Cited

U.S. PATENT DOCUMENTS

| | | | |
|---|---|---|---|
| 12,008,338 B2 * | 6/2024 | Morie | G06N 3/063 |
| 2005/0122238 A1 * | 6/2005 | Nomura | H03M 5/08 |
| | | | 341/53 |
| 2018/0204131 A1 * | 7/2018 | Najafi | G06N 7/01 |

OTHER PUBLICATIONS

Najafi, M. Hassan, et al. "Energy-efficient pulse-based convolution for near-sensor processing." 2020 IEEE International Symposium on Circuits and Systems (ISCAS). IEEE, 2020 (Year: 2020).*
Du, Kevin. "Time Domain Multiply and Accumulate Engine for Convolutional Neural Networks." Master's thesis, Ohio State University, 2020. http://rave.ohiolink.edu/etdc/view?acc_num=osu1606851287706869 (Year: 2020).*

* cited by examiner

*Primary Examiner* — Matthew D Sandifer
(74) *Attorney, Agent, or Firm* — Kean Miller LLP; Jessica C. Engler; Lauren J. Rucinski (57) ABSTRACT

Disclosed herein is a low-cost, high-performance, and energy-efficient near-sensor convolution engine based on pulsed unary processing. The disclosed engine removes the necessity of using costly analog-to-digital converters. Synthesis results show that the proposed pulse-based design significantly improves the hardware cost and energy consumption compared to the conventional fixed-point binary and also to the stochastic computing-based designs.

17 Claims, 10 Drawing Sheets

| Convolution Design | $V_{b1}$ | $V_{b2}$ | $W(nm)$ | $L(nm)$ |
|---|---|---|---|---|
| 3×3 | 0.6 | 0.5 | 1575 | 90 |
| 5×5 | 0.575 | 0.48 | 1800 | 90 |
| 7×7 | 0.57 | 0.448 | 2250 | 90 |

SYNTHESIS RESULTS OF UNIPOLAR DESIGNS

| Convolution Design | | Area ($\mu m^2$) | Delay (ns) | Power (mW) | Energy (pJ) | MAE (%) |
|---|---|---|---|---|---|---|
| 3×3 | 8-bit Fixed-Point | 6598 | 1.32 | 6.91 | 9.1 | 0.0 |
| | Stochastic-128 | 535 | 79.4 | 1.06 | 84.1 | 1.87% |
| | Pulsed Unary | 107 | 30 | 0.09 | 2.8 | 0.85% |
| 5×5 | 8-bit Fixed-Point | 22643 | 1.57 | 15.53 | 24.3 | 0.0 |
| | Stochastic-128 | 727 | 105.0 | 1.11 | 116.5 | 3.81% |
| | Pulsed Unary | 607 | 30 | 0.38 | 11.4 | 1.14% |
| 7×7 | 8-bit Fixed-Point | 42635 | 1.77 | 25.92 | 45.8 | 0.0 |
| | Stochastic-128 | 1013 | 124.2 | 1.30 | 161.4 | 17.23% |
| | Pulsed Unary | 782 | 30 | 0.99 | 29.9 | 1.67% |

FIGURE 7

SYNTHESIS RESULTS OF BIPOLAR DESIGNS

| Convolution Design | | Area ($\mu m^2$) | Delay (ns) | Power (mW) | Energy (pJ) | MAE (%) |
|---|---|---|---|---|---|---|
| 3×3 | 8-bit Fixed-Point | 9707 | 1.46 | 8.41 | 12.27 | 0.0 |
| | Stochastic-256 | 639 | 235.5 | 1.14 | 267.5 | 2.56% |
| | Pulsed Unary | 200 | 30 | 0.109 | 3.3 | 0.58% |
| 7×7 | 8-bit Fixed-Point | 57567 | 1.92 | 31.81 | 61.07 | 0.0 |
| | Stochastic-256 | 1602 | 332.8 | 1.83 | 609.0 | 6.89% |
| | Pulsed Unary | 700 | 30 | 0.79 | 23.7 | 1.26% |

METHOD FOR PULSE-BASED CONVOLUTION FOR NEAR-SENSOR PROCESSING

CROSS REFERENCE TO RELATED APPLICATION

This application claims priority to U.S. Provisional Application No. 63/033,355 titled "PULSE-BASED CONVOLUTION FOR NEAR-SENSOR PROCESSING" filed on Jun. 2, 2020.

STATEMENT REGARDING FEDERALLY SPONSORED RESEARCH OR DEVELOPMENT

Not applicable.

REFERENCE TO A "SEQUENCE LISTING", A TABLE, OR A COMPUTER PROGRAM

Not applicable.

DESCRIPTION OF THE DRAWINGS

The drawings constitute a part of this specification and include exemplary examples of the PULSE-BASED CONVOLUTION FOR NEAR-SENSOR PROCESSING, which may take the form of multiple embodiments. It is to be understood that, in some instances, various aspects of the invention may be shown exaggerated or enlarged to facilitate an understanding of the invention. Therefore, drawings may not be to scale. For the purposes of clarity, not every component may be labeled in every drawing.

FIELD OF THE INVENTION

The field of the invention is computer vision in the realm of convolutional neural networks. Specifically, this invention relates to stochastic computing architectures in convolutional neural networks.

BACKGROUND OF THE INVENTION

Near-sensor computing has received considerable attention in the era of Internet-of-Things (IoT). By integrating some of the processing circuits with a sensing device, significant overheads of memory and network communication costs can be avoided, resulting in considerable hardware area and power cost saving. Convolution is a widely used function in different applications, particularly in neural networks (NNs). Conventional fixed-point binary designs have been developed for hardware implementation of convolution functions. These designs are fast and accurate but also complex and costly. The high hardware cost of these designs and the inevitable cost of analog-to-digital converters (ADCs) make these designs inefficient for near-sensor processing.

Stochastic computing (SC) —an unconventional paradigm processing random bit-streams—has been used for low-cost and low-power design of convolution engines. See B. R. Gaines, "Stochastic computing systems", *Advances in Information Systems Science*, pages 37-172. Springer US, 1969; Armin Alaghi and John P. Hayes, Survey of stochastic computing, *ACM Trans. Embed. Comput. Syst.*, 12(2s):92:1-92:19, 2013. Multiplication as the main operation in convolution can be implemented using simple standard AND gates in the stochastic domain. SC-based designs are low-cost but incur very long latency and consume significantly higher energy than fixed-point binary counterparts. They also lack the accuracy of fixed-point designs. The high hardware cost of analog-to-stochastic converters (ASCs) further limits the application of SC-based designs for near-sensor processing. A. Alaghi, Cheng Li, and J. P. Hayes, Stochastic circuits for real-time image-processing applications, *Design Automation Conference (DAC)*, 2013 50th ACM/EDAC/IEEE, pages 1-6, May 2013; D. Fick, G. Kim, A. Wang, D. Blaauw, and D. Sylvester, Mixed-signal stochastic computation demonstrated in an image sensor with integrated 2d edge detection and noise filtering, *Proceedings of the IEEE* 2014 *Custom Integrated Circuits Conference*, pages 1-4, September 2014.

A hybrid stochastic-binary NN has been previously proposed for near-sensor computing. See Vincent T. Lee, Armin Alaghi, John P. Hayes, Visvesh Sathe, and Luis Ceze, Energy-efficient hybrid stochastic-binary neural networks for near-sensor computing, In *Proceedings of the Conference on Design, Automation Test in Europe*, pp. 13-18, European Design and Automation Association, 2017. This technology uses SC for low-cost implementation of the multiplication operations in the first convolutional layer of the network. An ASC is used to convert the sensor data directly to bit-stream representation. While the proposed design shows promising results compared to prior SC-based designs, the random fluctuations in generating bitstreams and the cost of ASCs limit its application for efficient near-sensor design of convolution engines.

Another design in the art removed the random fluctuations issue and developed a hybrid deterministic bit-stream-binary design. S. R. Faraji, M. Hassan Najafi, B. Li, D. J. Lilja, and K. Bazargan, Energy-efficient convolutional neural networks with deterministic bit-stream processing, 2019 *Design, Automation Test in Europe Conference Exhibition*, pp. 1757-1762, March 2019. By converting data from binary radix to low-discrepancy (LD) bit-streams they performed accurate multiplications and achieved the same result as the conventional fixed-point binary design. However, a requirement for this design is that the input data must be in the digital binary format to compare with LD random numbers to generate the bit-streams. In the case of near-sensor processing, therefore, the analog input data from sensor must first be converted to digital binary format using costly ADCs and then be converted to LD bit-streams.

Pulse-based processing is a hybrid mixed-signal computation technique that combines the advantages of analog and digital designs. Multiplication of input data represented using pulsed signals was always an important challenge in early pulse-based designs. Pulsed (or time-encoded) unary processing was introduced recently in the art for high-performance processing of data using low-cost SC circuits. See M. Hassan Najafi, S. Jamali-Zavareh, D. J. Lilja, M. D. Riedel, K. Bazargan, and R. Harjani. An Overview of Time-Based Computing with Stochastic Constructs. *IEEE Micro*, 37(6):62-71, November 2017; M. Hassan Najafi, S. Jamali-Zavareh, D. J. Lilja, M. D. Riedel, K. Bazargan, and R. Harjani, Time-Encoded Values for Highly Efficient Stochastic Circuits, *IEEE Transactions on Very Large Scale Integration (VLSI) Systems*, 25(5):1644-1657, May 2017. The designs inherit the low-cost advantage of SC but produce deterministic and accurate results in significantly shorter time compared to the conventional digital bit-stream-based SC. Multiplication, scaled addition, and absolute value subtraction of pulsed unary signals have been disclosed in the art. Maximum and minimum value functions based on pulsed unary processing have also been disclosed in the art for high-performance and energy-efficient design of sorting networks.

Unary processing is a hybrid information processing technique that has characteristics common to both the conventional binary and to SC. It is deterministic, but borrows the concept of averaging from stochastic methods. Input data is encoded uniformly by a sequence of one value (say 1) followed by a sequence of the other value (say 0) in a stream of 1's and 0's.

Similar to stochastic bit-streams, the value of a unary bit-stream is defined by the ratio of 1's in the bit-stream. For example, 1100 and 111000 are two unipolar unary bit-streams representing 0.5. In the unipolar representation, each real-valued number x (0<x<1) is represented by a unary bit-stream where each bit has probability x of being one. In the bipolar representation, each real-valued number y (−1<y<1) is represented by a unary bit-stream where each bit has probability (y+1)/2 of being one. While the bipolar format can deal with negative numbers directly, given the same bit-stream length, the precision of the unipolar format is twice that of the bipolar format.

Figure 1:
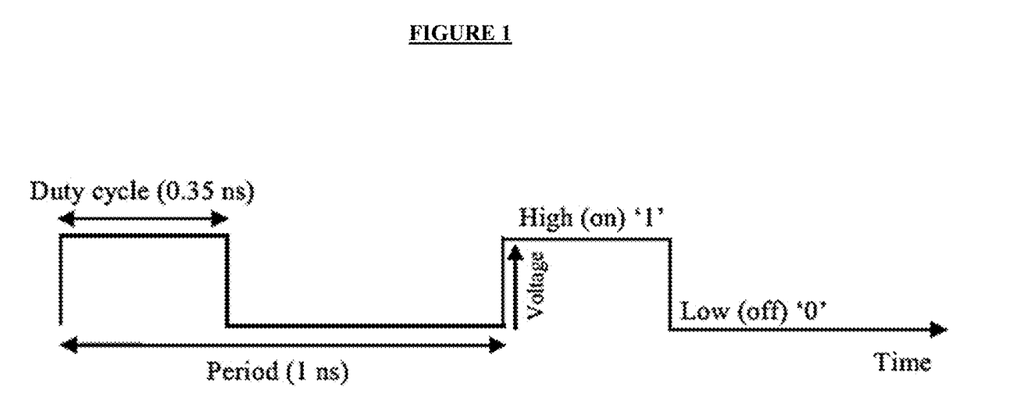
FIG. 1 is a graph of a pulse width modulated (PWM) signal. The value represented in FIG. 1 is the fraction of the time that the signal is high in each cycle; here, 0.35 ns.

The representation of numbers in unary processing is not limited to digital serial bit-streams. A time-based interpretation of numbers is also possible by pulse-width modulation of data as shown in FIG. 1. Pulse-width modulated (PWM) signals can be treated as the inputs of unary processing circuits with values defined by their duty cycle.

Figure 2:
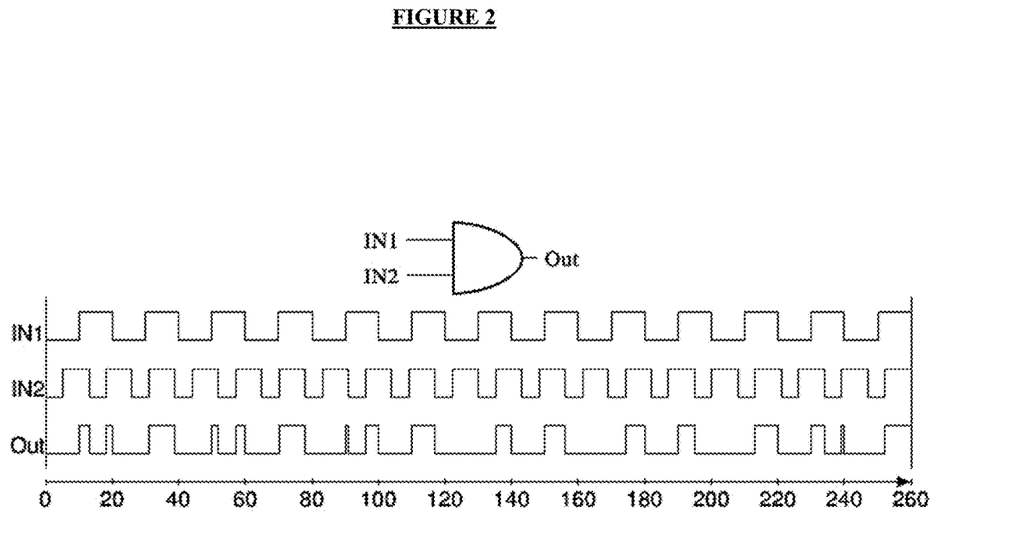
FIG. 2 is a graphical example of the results of multiplying two unipolar PWM signals using the depicted AND gate, wherein IN1 represents 0.5 with a period of 20 ns and IN2 represents 0.6 with a period of 13 ns. The output signal represents 0.30 (78 ns/260 ns), the expected value from multiplication of the inputs.

Multiplication of pulsed unary data has been recently discussed, by first converting data into inharmonic PWM signals and then logical ANDing the generated signals. The duty cycle of the PWM signals is set to the value represented. Relatively prime periods (inharmonic frequencies) are selected for the input signals and the operation is run for the product of the periods to produce deterministic and accurate results. FIG. 2 shows an example of multiplying two input data in the pulsed unary domain.

Standard OR gates can be used for addition of pulse signals. The OR-based addition, however, is distorted by pulse overlap and can only be used when adding a small number of inputs. See Wolfgang Maass and Christopher M Bishop, *Pulsed neural networks*, MIT press, 2001. Current summation via an active integrator is a better choice to the OR-based addition. It does not incur any loss of activity information and does support adding a larger number of inputs. It should be considered that the output from current summation is no longer a pure pulse signal; it usually is averaged, and must be connected to a pulse-width modulator to regenerate a PWM signal.

While pulsed unary processing is deterministic, it comes at the cost of a slight accuracy loss. The frequency of analog-to-time-converters (ATCs) (e.g., pulse-width modulators) and so the frequency of the generated pulses affects the effective number of bits (ENOB) in representing and processing data. The lower the frequency, the higher the ENOB. Imperfect generation of PWM signals and error in measuring the output signals are the main sources of inaccuracy in pulsed unary processing.

SUMMARY OF THE INVENTION

Figure 3:
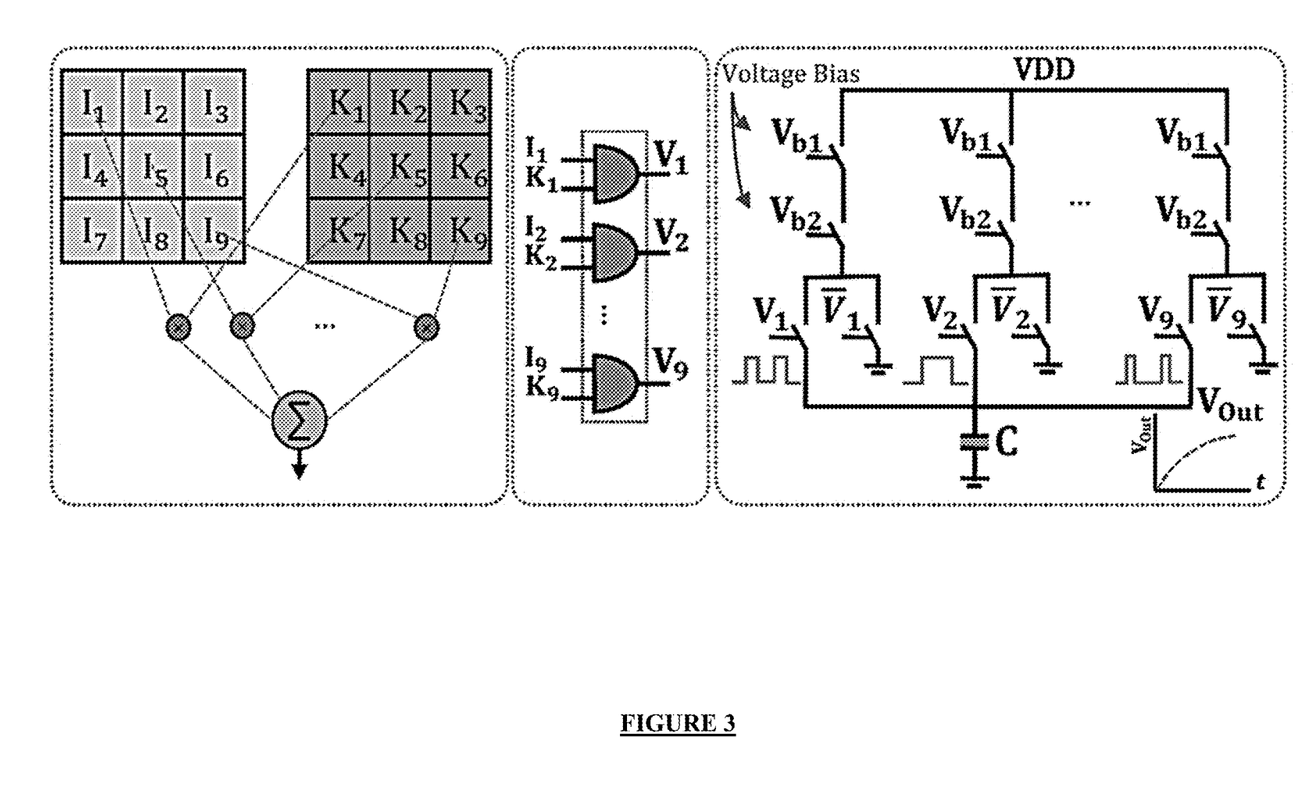
FIG. 3 is a 3×3 Unipolar Convolution Engine comprising a (left) convolution process, (middle) multiplication using AND gates, and (right) accumulation using an active integrator.

Disclosed herein is an N×N convolution engine comprising $N^2$ multiplication operations and a summation operation that accumulates the results. In this disclosed near-sensor convolution engine, all input data is first converted to pulse signals. In one embodiment, this conversion is done by using an ATC such as a PWM signal generator. Two inharmonic frequencies are selected for the input signals, each for one input of every multiplication. The frequencies can be adjusted based upon the desired accuracy. Outputs of AND gates are connected to an active integrator accumulating the outputs of the multipliers. FIG. 3 shows the proposed convolution design for N=3 for unipolar inputs. One frequency is used for all "I" values, and another frequency is used for all "K" values, where the frequencies must be inharmonic.

The near-sensor engine comprises three blocks. The first block comprises a PWM signal generator that converts the analog input data to a PWM signal with corresponding duty cycle. The second block comprises multiple AND gates to perform multiplications in the pulsed unary domain. The third block comprises a time-to-voltage converter that accumulates and integrates output signals over time and generates an analog voltage. In one embodiment, the generated voltage is converted to a digital format for further processing in the digital domain.

In the developed convolution engine, a low-cost and high-performance integrator integrates the outputs of the AND gates in analog domain. The integrator first converts the output signals to their corresponding currents and then integrates them over time in a capacitor. The integrator uses the same size current source for all inputs. Each input sinks a current into the capacitor based on the length of its high parts. In one embodiment, a cascode structure with two PMOS transistors implements each current source. The two PMOS transistors are used to route the current from the source to the capacitor and also to reduce the effect of clock feed-through. In the high phase of the output signal, one of these transistors sinks the current into the capacitor and in the low phase, the other transistor sinks the current into the ground. With this technique, a voltage is kept at the output of the current source, linearity is increased, and the effect of clock feed-through on the capacitor is reduced.

DETAILED DESCRIPTION OF THE INVENTION

Figure 4:
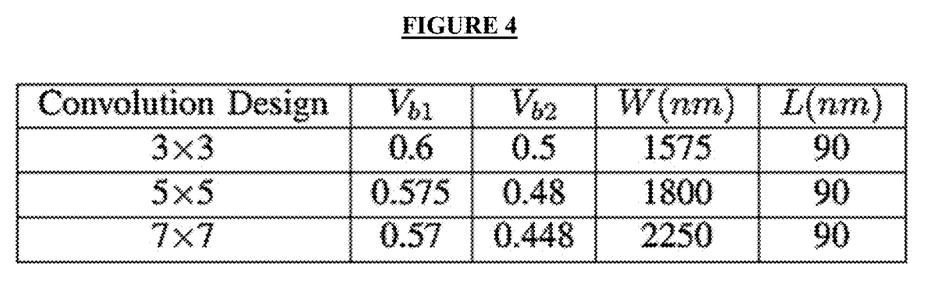
FIG. 4 is a table of the selected integrator parameters for different convolution windows; wherein, $V_{b1}$ and $V_{b2}$ are the bias voltages to sink current from VDD into switches. W and L are the width and length of each transistor, and all transistors have the same size.

The developed circuit can work linearly only for a specific part of the input range, which limits the range of its output. The output, however, can be amplified using a simple linear amplifier to feed the next stage. The circuit parameters can be adjusted accordingly based on the application specification (e.g., for 3×3, 5×5, or 7×7 convolution windows). The disclosed circuit is designed for two clock periods of 5 ns and 6 ns as the periods of the input PWM signals. These periods are optimum choices to achieve reasonable accuracy and latency. By choosing these periods, the output can be captured every 30 ns by the next stage. FIG. 4 shows example integrator parameters for three different convolution windows. In this table, $V_{b1}$ and $V_{b2}$ are the bias voltages to sink current from VDD into switches. W and L are the width and length of each transistor, with all transistors being the same size.

Figure 5:
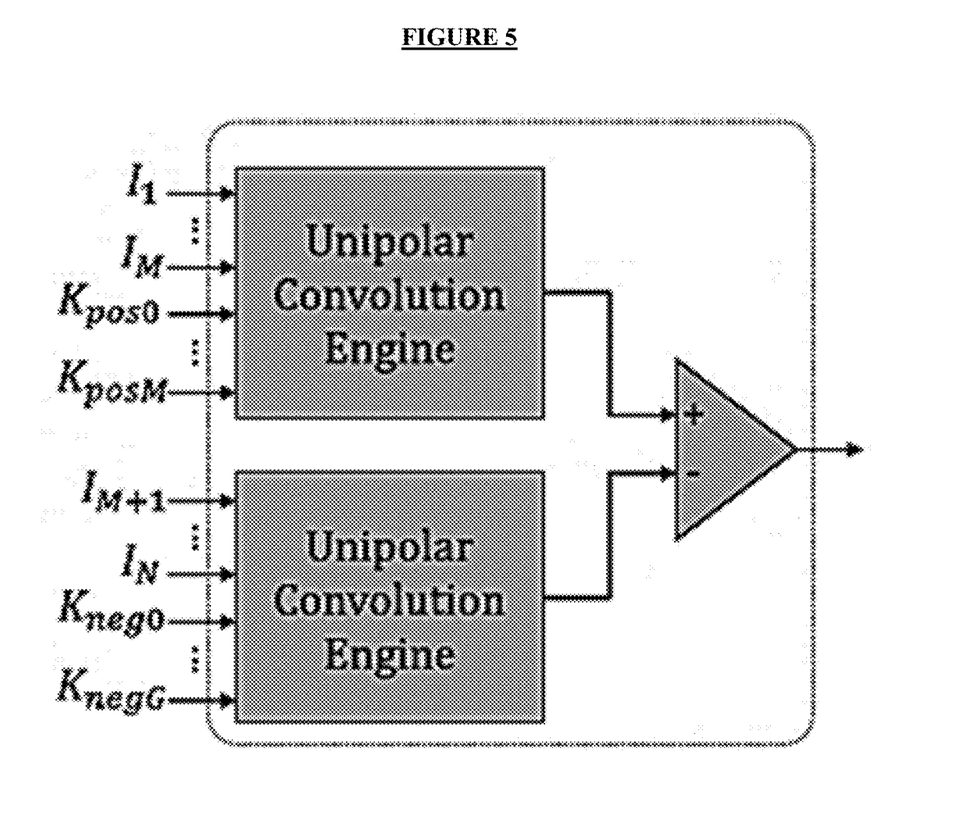
FIG. 5 is a rendering of the disclosed N×N convolution engine to support bipolar inputs.

As the convolution engine is optimized for near-sensor data processing, the main input is anticipated to be positive and comes from sensors. In neural network applications, the convolution engines also have weights that can be negative. Thus, the disclosed engine also supports bipolar (signed) multiplications. FIG. 5 shows the block diagram of the disclosed N×N convolution engine to support bipolar inputs. The design utilizes two unipolar convolution engines to achieve a bipolar engine. The first unipolar engine implements a convolution kernel for only positive weights and the second engine calculates the kernel for only negative weights processing their absolute value. This splitting is feasible as the weights are already known and fixed in the inference step of neural networks. After processing the positive and the negative weights separately, a differential amplifier is used to subtract the outputs and calculate the final result.

The efficiency of the disclosed pulse-based convolution engine was evaluated in terms of area footprint, latency (critical path delay×number of cycles), power, and energy consumption compared to the conventional digital binary and also to the SC-based designs. The proposed unipolar engine for N=3, 5, and 7 and the bipolar engine for N=3 and 7 were compared to their corresponding fixed-point binary and SC counterparts. The input data is assumed to be coming from sensors and is in analog voltage/current format.

For the conventional digital binary approach, an 8-bit precision fixed-point design is implemented. Here, the input data is first converted to a digital binary format using an ADC or other known methods for conversion in the art. For the SC-based design, multiplication operations are performed using unipolar bit-streams when evaluating the proposed unipolar engine. For the case of bipolar design, bipolar bit-streams are used while AND gates are replaced by XNOR gates as XNOR gates must be used for multiplication in the bipolar stochastic domain. The output bit-streams are accumulated using regular binary adders. The input data can be converted to stochastic bit-streams using an ASC, or an ADC plus a digital binary-to-stochastic converter. The binary input data is converted to 128-bit (256-bit) unipolar (bipolar) LD bit-streams by comparing them to the first 128 (256) Sobol numbers from the MATLAB's built-in first two Sobol sequences.

For the proposed pulse-based design, the input data is converted to PWM signals with 5 ns and 6 ns periods. The outputs of multiplications are therefore ready after 30 ns. The HSPICE pulse generator is used to generate the PWM signals. The outputs are accumulated using an active integrator as shown in FIG. 3. The fixed-point binary and the SC-based designs are synthesized using the Synopsys Design Compiler v2018.06-SP2 with the 45-nm NCSU-FreePDK library. The same library is also used to estimate the cost of the pulsed unary design. Performance and power consumption of the pulse-based designs are evaluated using the Synopsys HSPICE v2018.09. The cost of senor data conversion was not evaluated; however, prior research in the art has shown that ASCs are as costly as regular ADCs, which are more costly than ATCs. If cost was incorporated, the disclosed pulse-based method would have shown even further improvements.

Figure 6:
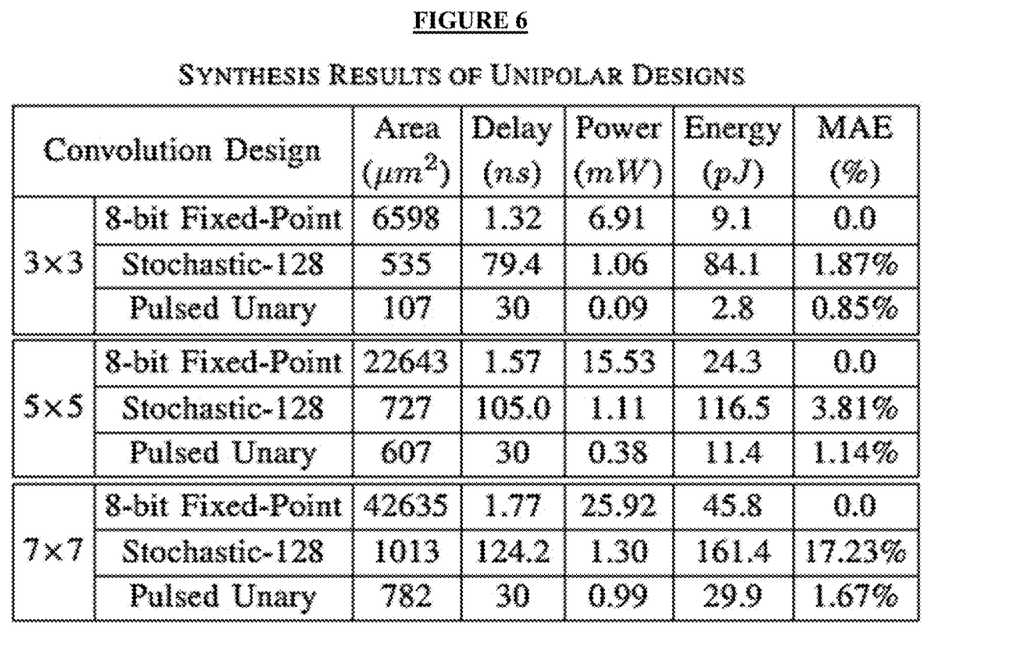
FIG. 6 is a table providing the synthesis and performance evaluation results of unipolar engines.
Figure 7:
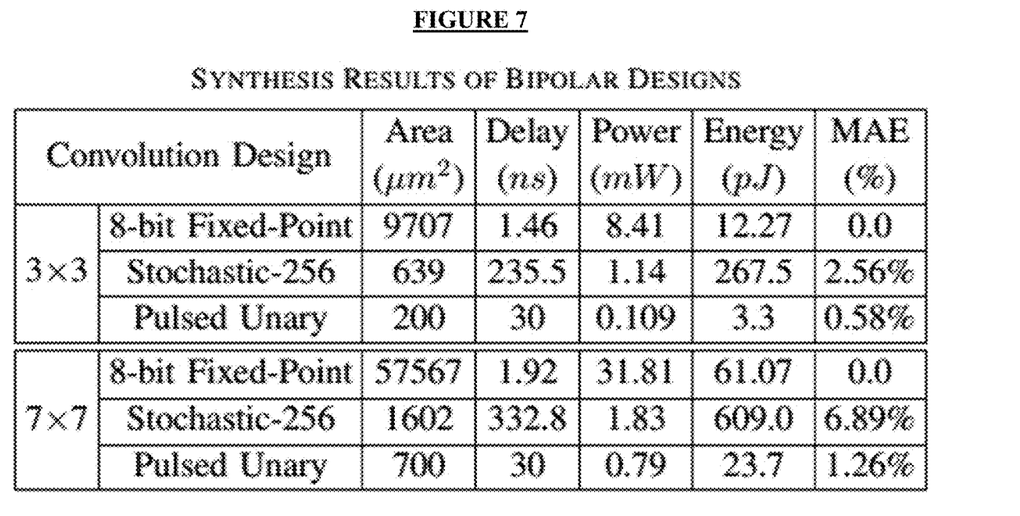
FIG. 7 is a table providing the synthesis and performance evaluation results of bipolar engines.

FIGS. 6 and 7 show the synthesis and the performance evaluation results of the unipolar and bipolar engines, respectively. As can be seen, the pulse-based designs have minimal hardware area cost. The area saving in the pulsed designs compared to the SC designs is due to using an active integrator in accumulating the multiplications results instead of using costly binary adders. The power and energy consumption are also significantly improved with the disclosed design.

The performance of each design can be evaluated by finding the mean absolute error (MAE) of 1000 trials performing convolution on 1000 random sets of input data. For the SC and pulsed designs, the expected results of greater than 1.0 were set to 1.0. The last columns in the tables of FIGS. 6 and 7 provide the MAE of each design. As can be seen in FIGS. 6 and 7, the disclosed design has a lower accuracy compared to the fixed-point but a better accuracy compared to the SC designs. A limitation of the proposed mixed-signal design is that the range of the capacitor's voltage is between 0 and 1 V. Therefore, if two unary pulses with duty cycles of more than 50% are added, the output voltage is clipped at 1.0 V as the capacitor's voltage cannot exceed 1.0 V. This limitation worsens as the size of the convolution engine increases. Therefore, to evaluate the linearity of the proposed engines, the maximum value of the random inputs for the unipolar engine was set to 0.5, 0.3, and 0.15 for convolution sizes of 3×3, 5×5, and 7×7, respectively. Also, for the bipolar engine, the maximum value of the random input was set to 0.6 and 0.3 for convolution sizes of 3×3 and 7×7, respectively. Note that some neural networks such as ResNet-18 use a Hard-Tanh unit after the convolution engine. The Hard-Tanh unit keeps the output of the engine intact if it is in the [−1,1] interval and clips it if it is out of this range. The output range limitation of the proposed design can therefore be useful and play a Hard-Tanh role in such applications.

Figure 8:
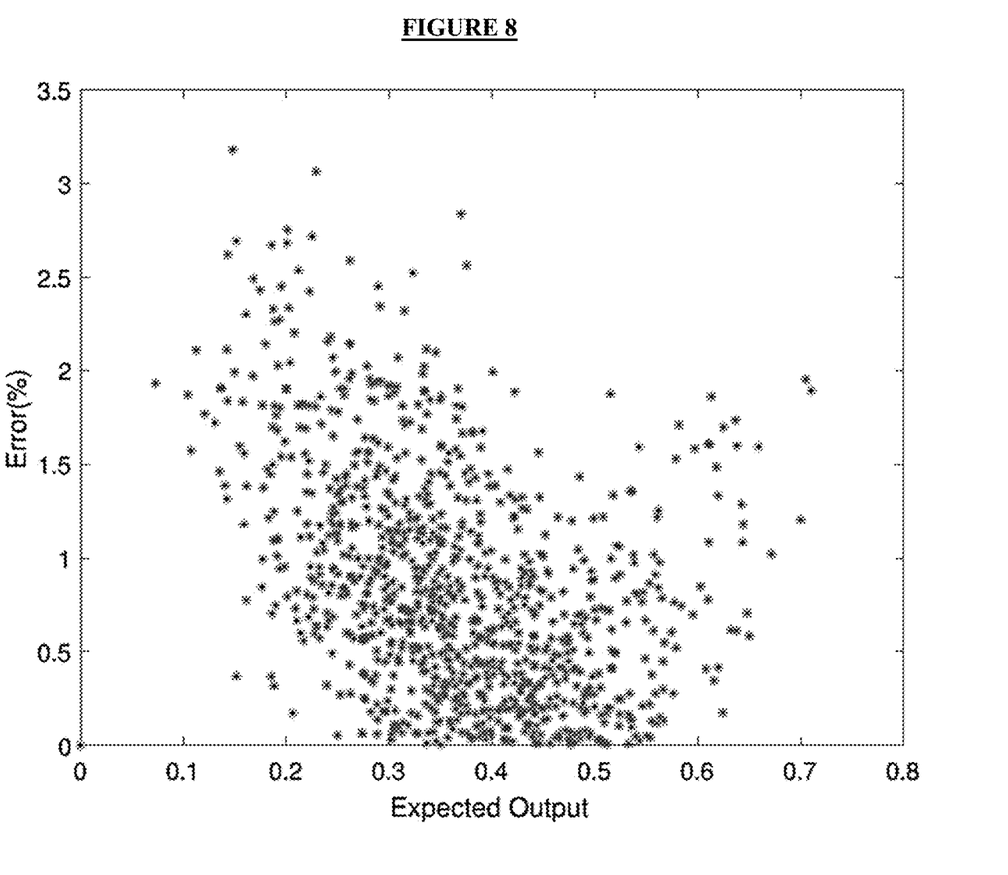
FIG. 8 provides a chart of the error distribution of the disclosed unipolar convolution engine, wherein the mean absolute error (MAE) of a 9-input engine is 0.855%.
Figure 9:
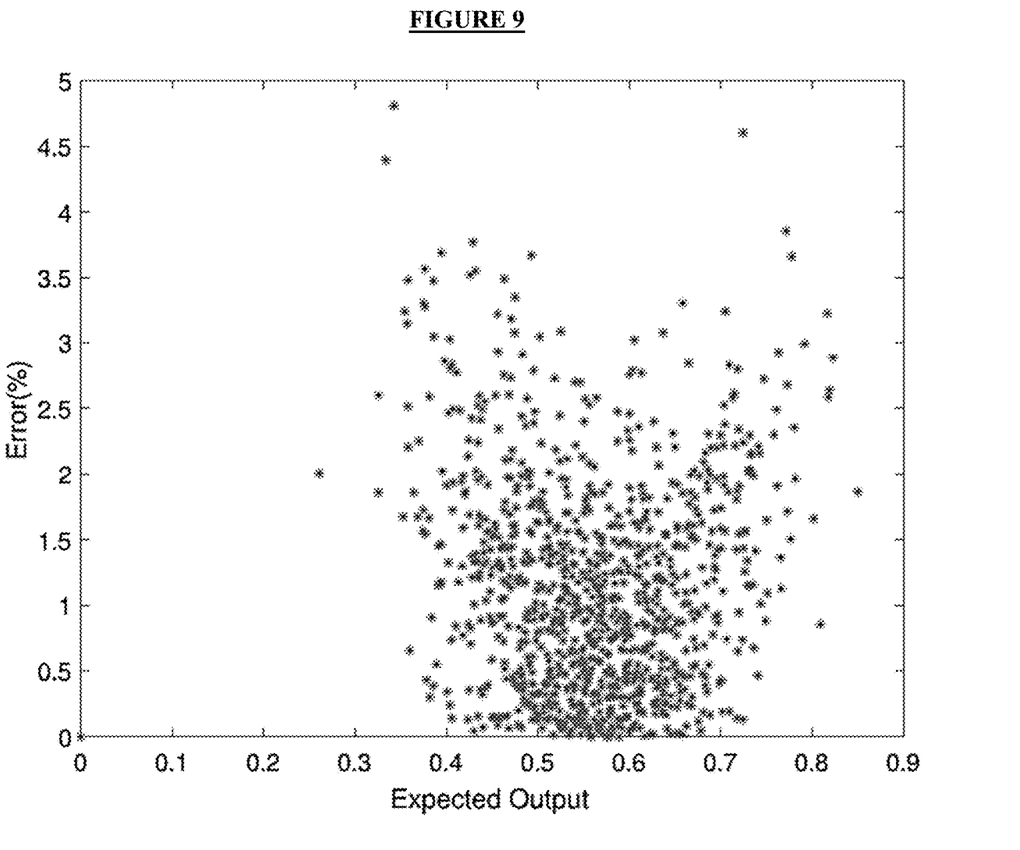
FIG. 9 provides a chart of the error distribution of the disclosed unipolar convolution engine, wherein the MAE of a 25 input engine is 1.14%.
Figure 10:
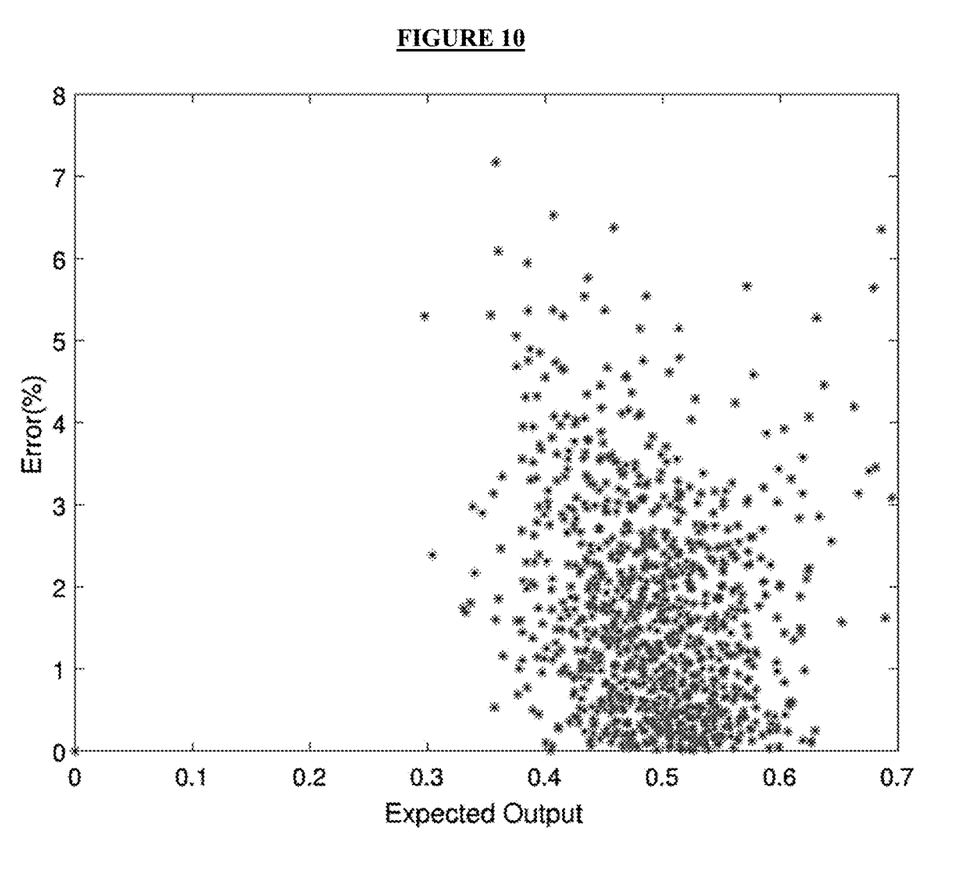
FIG. 10 provides a chart of the error distribution of the disclosed unipolar convolution engine, wherein the MAE of a 49 input engine is 1.675%.
Figure 11:
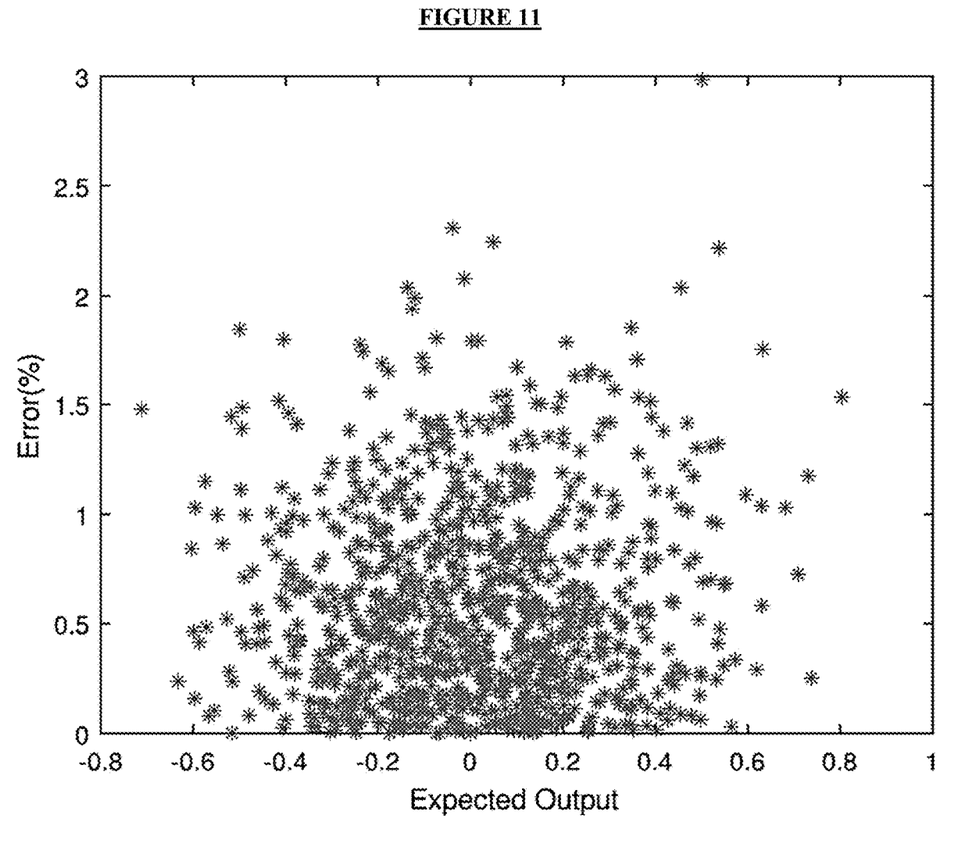
FIG. 11 provides a chart of the error distribution of the disclosed bipolar convolution engine, wherein the MAE of a 9 input engine is 0.58%.
Figure 12:
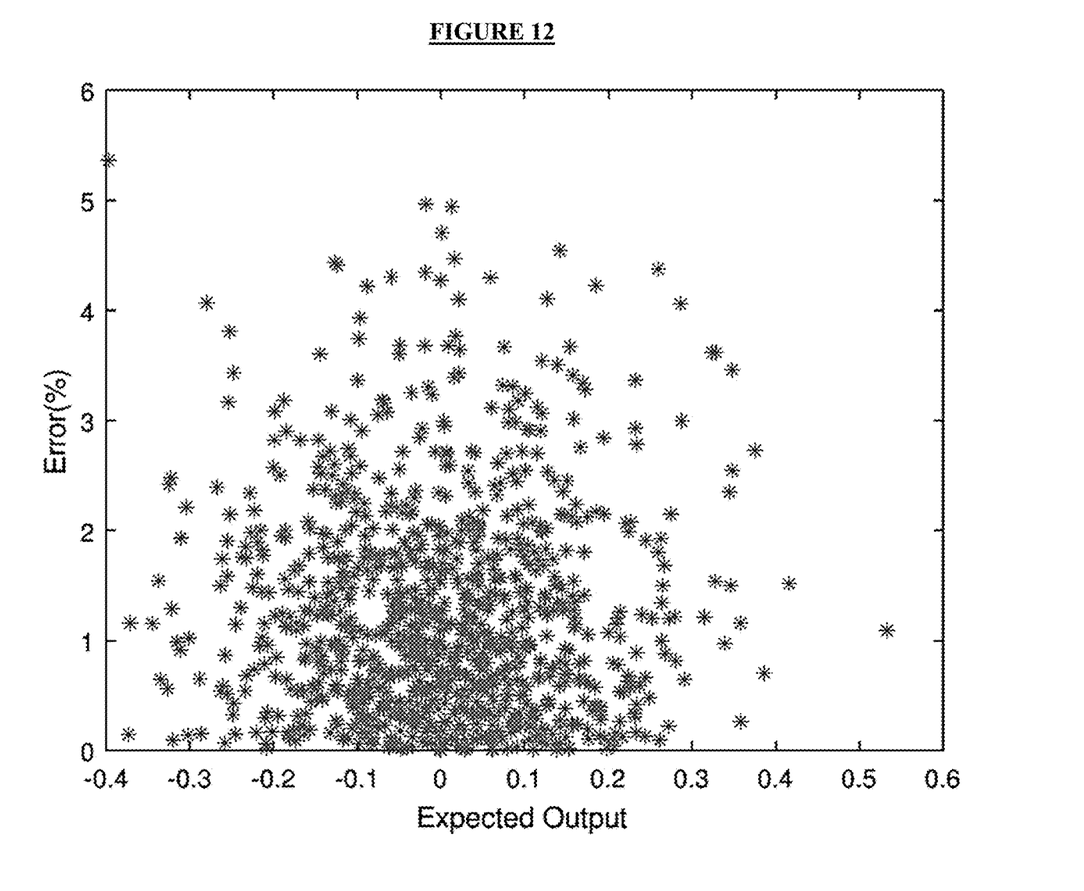
FIG. 12 provides a chart of the error distribution of the disclosed bipolar convolution engine, wherein the MAE of a 49 input engine is 1.26%.

FIGS. 8, 9, and 10 show the error distribution of the evaluated unipolar pulsed designs for the 1000 random input sets for 9 inputs, 25 inputs, and 49 inputs, respectively. The x-axis shows the expected output voltage while the y-axis shows the absolute error between expected and measured values. Similarly, FIGS. 11 and 12 show the error distribution of the evaluated bipolar pulsed designs for 1000 random input sets for 9 inputs and 49 inputs, respectively.

With more and more sensors providing time-encoded outputs, a large number of the proposed pulse-based convolution engine can be used in parallel near sensor to immediately process data. This eliminates the need for costly ADCs/ASCs and also avoids wasting resources on memory and network communications.

Pulsed unary processing combines an analog time-based representation of data with digital processing using simple logic gates. In this work, a low-cost, high-performance, and energy-efficient near-sensor convolution engine based on pulsed unary processing is disclosed. The design is compatible with the data provided by the sensors avoiding costly ADCs. The down-side to the proposed design is some inaccuracies due to the mixed-signal nature of the design. The inaccuracy, however, can be masked and tolerated by the application (e.g., neural networks).

The subject matter of the present invention has been disclosed as being intended for use in near-sensor convolutional neural networks; however, those having skill in the art may recognize the applicability of the designs and methods to other industries. Nothing in this disclosure is intended to limit the design to one industry or technology.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies.

Modifications, additions, or omission may be made to the systems, apparatuses and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to a member of a set or each member of a subset of a set.

Furthermore, the described features, structures, or characteristics may be combined in any suitable manner in one or more embodiments. Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Moreover, the terms "substantially" or "approximately" as used herein may be applied to modify any quantitative representation that could permissibly vary without resulting in a change to the basic function to which it is related.

We claim:

1. An N×N bipolar near-sensor convolutional engine comprising:
   two or more pulse width modulation (PWM) signal generators, comprising two or more inputs;
   two or more AND gates comprising configuration to perform multiplications in a pulsed unary domain;
      wherein the two or more AND gates each comprise an output; and
      wherein the outputs of each AND are connected to a time-to-voltage converter;
   wherein the time-to-voltage converter comprises an integrator comprising functionality to integrate outputs of the AND gates;
   wherein the each PWM signal generator of the two or more PWM signal generators comprises functionality to convert an analog input data to a PWM signal with a corresponding duty cycle;
   wherein the time-to-voltage converter comprises functionality to accumulate and integrate one or more output signals over time; and
   wherein the time-to-voltage converter comprises functionality to generate an analog voltage output.

2. The engine of claim 1, wherein the integrator comprising functionality to integrate outputs of the AND gates in an analog domain.

3. The engine of claim 1, wherein the time-to-voltage converter comprises an integrator comprising functionality to integrate outputs of the AND gates in an analog domain; and wherein the integrator converts to the outputs' corresponding currents.

4. The engine of claim 1, wherein the time-to-voltage converter comprises an integrator comprising functionality to integrate outputs of the AND gates in an analog domain; and wherein the integrator converts to the outputs' corresponding currents; and wherein a capacitor integrates the converted inputs over time.

5. The engine of claim 1, wherein the time-to-voltage converter comprises an integrator comprising functionality to integrate outputs of the AND gates in an analog domain; and wherein the integrator converts to the outputs' corresponding currents; and wherein the integrator uses an identical current source for all inputs.

6. The engine of claim 1, wherein the time-to-voltage converter comprises an integrator comprising functionality to integrate outputs of the AND gates in an analog domain; and wherein the integrator converts to the outputs' corresponding currents; wherein a capacitor integrates the converted inputs over time; and
   wherein each input applies a current into the capacitor measured by a length of the input signal's high parts.

7. The engine of claim 1, further comprising two PMOS transistors comprising functionality to implement a current source.

8. The engine of claim 1, further comprising two PMOS transistors and at least one capacitor.

9. The engine of claim 1, further comprising two PMOS transistors and at least one capacitor, wherein the PMOS transistors comprising functionality to route a current source to the capacitor.

10. The engine of claim 1, further comprising two PMOS transistors and at least one capacitor, wherein in a high phase of an output signal, one PMOS transistor sinks applied current into the capacitor.

11. The engine of claim 1, further comprising two PMOS transistors and at least one capacitor, wherein in a low phase of an output signal, one PMOS transistor sinks applied current into ground.

12. A method for performing pulse-based convolution in a neural network, comprising:
   a. Providing an N×N bipolar near-sensor convolutional engine comprising:
      two or more pulse width modulation (PWM) signal generators;
      two or more AND gates comprising configuration to perform multiplications in a pulsed unary domain; and
      a time-to-voltage converter;
   b. the each PWM signal generator of the two or more PWM signal generators comprises converts an analog input data to a PWM signal with a corresponding duty signal;

c. time-to-voltage converter that accumulates and integrates one or more output signals over time; and
d. time-to-voltage converter generates an analog voltage output;
e. wherein the time-to-voltage converter comprises an integrator, which integrates the outputs of the AND gates in an analog domain;
f. the integrator converts the one or more output signals to the output signals' corresponding currents and integrates said signals over time in a capacitor;
g. providing two PMOS transistors, which route a current source to a capacitor, wherein when the output signal is in a high phase, one PMOS transistor sinks the current into the capacitor; and
wherein when the output signal is in a low phase, one PMOS transistor sinks the current into ground.

13. The method of claim 12, wherein the input pulse signals comprise two inharmonic frequencies.

14. The method of claim 12, wherein the input data is converted to pulse signals by two or more pulse width modulation (PWM) signal generators.

15. The method of claim 12, wherein the input pulse signals comprise two inharmonic frequencies; and wherein the inharmonic frequencies can be adjusted according to needed accuracy.

16. The method of claim 12, wherein values of the positive weights and negative weights are determined and fixed in an inference step in the neural network.

17. The method of claim 12, wherein the integrator uses an identical size current source for all inputs.

* * * * *